United States Patent [19]

DeRosa et al.

[11] Patent Number: 4,877,361
[45] Date of Patent: Oct. 31, 1989

[54] ELASTOMERIC INSERT FOR CONTAINER LASHING

[75] Inventors: Angelo DeRosa; Kevin D. McKenna, both of Holmdel, N.J.

[73] Assignee: Sterling Plastic & Rubber Products, Inc., South Amboy, N.J.

[21] Appl. No.: 942,274

[22] Filed: Dec. 16, 1986

[51] Int. Cl.⁴ .......................... B60P 7/13; B61D 45/00
[52] U.S. Cl. ...................................... 410/112; 410/116
[58] Field of Search .............. 410/101, 112, 113, 114, 410/96, 55, 87, 86, 80, 109, 107, 116, 83, 111, 106, 108, 109, 115, 116; 238/283, 382, 302, 2; 24/453, 297, 590, 597, 265 CD

[56] References Cited

U.S. PATENT DOCUMENTS

| 24,443 | 6/1859 | Carpenter | 238/283 |
|---|---|---|---|
| 3,252,681 | 5/1966 | Watts | 410/116 |
| 3,796,404 | 3/1974 | Shields | 410/55 |
| 3,927,623 | 12/1975 | Caron | 410/112 |
| 4,457,650 | 7/1984 | Tseng | 410/112 X |
| 4,488,333 | 12/1984 | Tracy | 410/101 X |
| 4,500,037 | 2/1985 | Braitsch et al. | 238/382 X |
| 4,645,392 | 2/1987 | Takaguchi | 410/101 X |

Primary Examiner—Robert B. Reeves
Assistant Examiner—Joseph D. Pape
Attorney, Agent, or Firm—Leo C. Krazinski

[57] ABSTRACT

An elastomeric insert for filling the cavity of a bottom foundation fitting or socket in a steel deck of a conveyance, such as a steel container ship, whereby a lashing knuckle of a binder tie down rod for lashing a container to the deck is readily secured within the socket, while the insert remains disposed within the socket, so as to prevent the intrusion of debris and dirt, as well as water, from entering the socket cavity, thereby maintaining access and utility of the deck sockets.

5 Claims, 2 Drawing Sheets

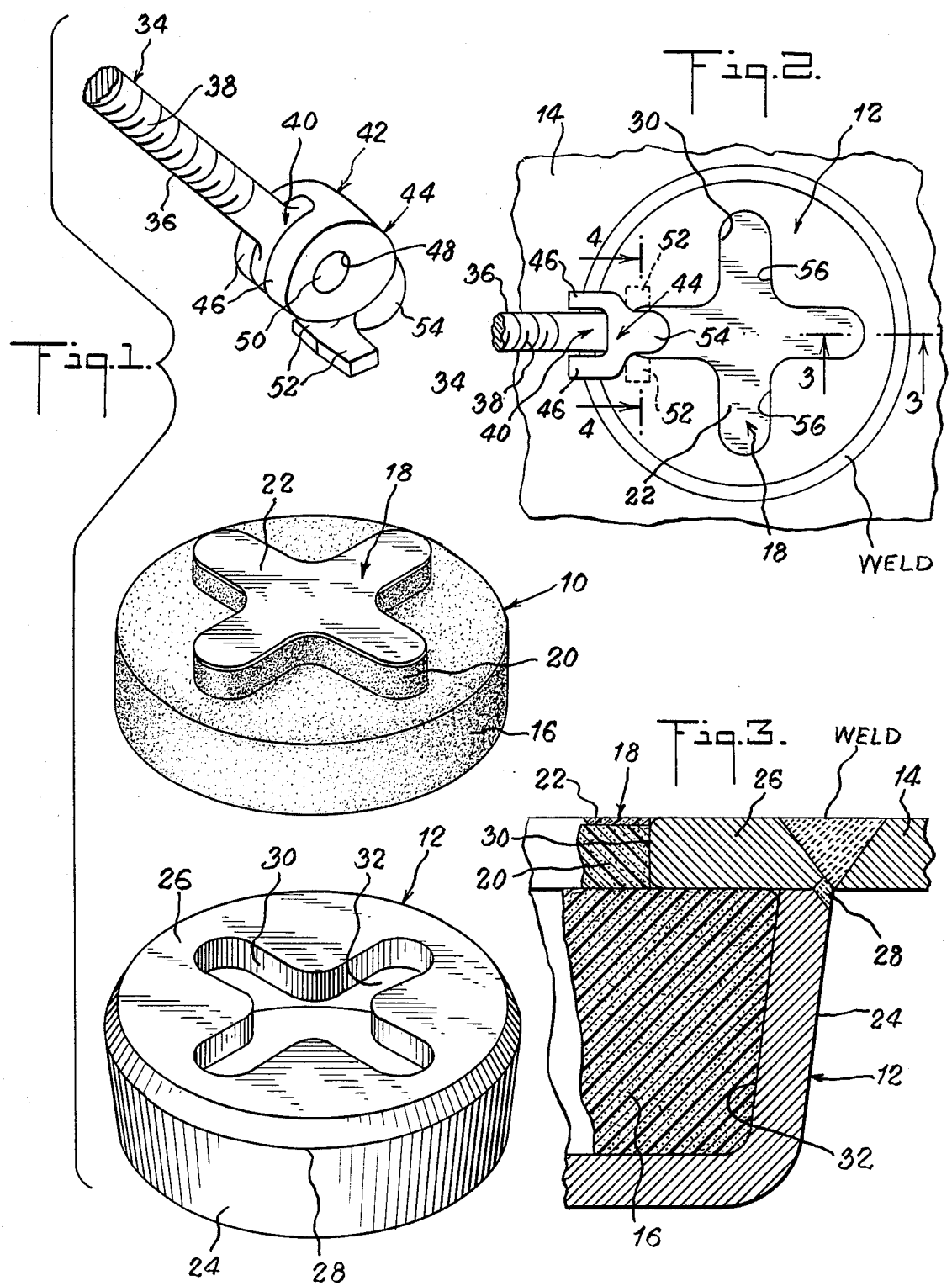

ELASTOMERIC INSERT FOR CONTAINER LASHING

BACKGROUND OF THE INVENTION

1. FIELD OF THE INVENTION

The present invention relates to cargo container ships and, more particularly, to the placement of elastomeric inserts in the cavities of bottom foundation fittings or sockets installed in the decks of the ships, whereby foreign material is prevented from entering the socket cavities and whereby the accessibility and the utility of the deck sockets are maintained for use of lashing binders.

2. DESCRIPTION OF PRIOR ART

As far as applicant is aware, the cavities of sockets on container ships remain exposed to the elements for inclusion therein of debris, water that forms into ice, etc., thereby requiring manual removal thereof before the lashing binder knuckle can be inserted into the socket cavity for lashing the container to the ship's deck.

SUMMARY OF THE INVENTION

Accordingly, an object of the present invention is to provide an improved deck socket arrangement more efficiently usable with lashing equipment.

Another object of the present invention is to provide an improved insert for filling a cavity of a lashing deck socket.

Still another object of the present invention is to provide an improved deck socket having its cavity filled with the insert, whereby the lashing binder knuckle may be secured to and removed from the socket while its cavity is maintained filled with the insert.

Still another object of the present invention is to provide improved deck socket cavities filled with inserts that prevent entrance therein of water, debris, etc., and at the same time provide a level surface of the deck during periods when lashing of containers is not required.

Still another object of the present invention is to eliminate manually removable operations of debris, etc., from the deck sockets.

Yet another object of the present invention is to provide several shapes and contours of the insert in order to fill corresponding shapes and contours of the deck sockets.

A further object of the present invention is to accomplish the foregoing objects in a simple, practical amd economical manner.

Other and further objects will be obvious upon an understanding of the illustrative embodiments about to be described, or will be indicated in the appended claims, and various advantages not referred to herein will occur to one skilled in the art upon employment of the invention in practice.

In accordance with the present invention the foregoing objects are generally accomplished by providing an improved arrangement which comprises a socket having a cavity covered by a plate that includes openings of predetermined contour for insertion therethrough and into the cavity of an insert having a portion thereof of the same contour as of the plate openings and having another portion thereof for filling the remainder of the cavity, to provide a top surface of the socket level with that of a ship's deck when installed in the deck. While filled with the insert the socket provides a means for enabling a binder knuckle of lashing equipment to be readily inserted into and withdrawn therefrom and, during non-use of the lashing equipment, provides a level deck surface and thus prevents foreign debris from entering into the socket cavity.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is an exploded perspective view of a socket, insert and binding lashing knuckle in accordance with the present invention showing the socket plate openings and the upper portion of the insert as of clover-leaf contour.

FIG. 2 is a top plan view of the socket with the insert and lashing knuckle in place.

FIG. 3 is an enlarged sectional view taken along the line 3—3 on FIG. 2 showing the socket cavity and plate openings filled with the insert to the level of the plate top surface.

DESCRIPTION OF PREFERRED EMBODIMENTS

Figure 4:
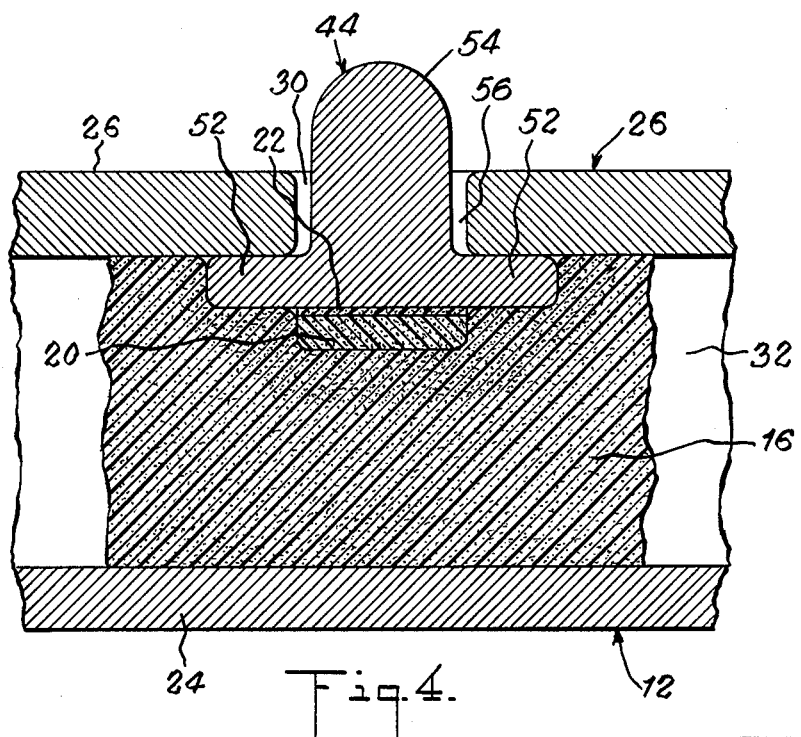
FIG. 4 is an enlarged sectional view taken along line 4—4 on FIG. 2 showing the binder lashing knuckle in place within the socket cavity.

Referring now to the drawings in detail, particularly to FIG. 1, there is shown an elastomeric insert 10 that is adapted to be placed within a lashing bottom foundation fitting or socket 12, in turn installed with its upper surface flush in a deck 14 of a vessel or vehicle (not shown), the socket thus presenting a flat deck surface to pesonnel and vehicles. The insert 10 comprises a two piece glued unit having a base 16 and top 18 of closed cell polyether foam manufactured in accordance with formulation 441509 and having a density of 1.36 pounds per cubic foot. The formulation 441509 is manufactured by Sterling Plastic and Rubber Products, Inc. of 548 Route 35, South Amboy, N.J. 08879. The base 16 is a circular element of a predetermined diameter and thickness, while the top 18 is shown as of a clover-leaf configuration having a predetermined thickness, as will be brought out hereinafter. The top 18 includes a body 20 having at its upper surface a film 22 bonded to it permanently with 60 durometer neoprene (Sterling Plastic and Rubber Products, Inc. formulation 5927-60) and having its lower surface permanently bonded to the upper surface of the base 16 with suitable synthetic rubber foam tearing adhesive.

The socket 12 comprises a cylindrical base 24 at the upper edge of which is shown a plate 26 secured thereto by a continuous welding 28 around its periphery. A clover-leaf opening 30 is shown in the plate 26 to provide an entrance into a cavity 32 formed within the socket 12, as bounded by the interiors of the base 24 and the plate 26. The dimensions of the socket 12 obviously determine the dimensions of the insert 10, so that the insert 10 can be pressed through the clover-leaf opening 30 into the cavity 32 to produce the filled condition of the socket 12, as shown partially in FIG. 3.

Referring now to FIGS. 1, 2, 3 and 4, at the top of FIG. 1 is shown a conventional tie-down rod 34 of a container lashing binder (not shown) comprising a rod 36 provided with threads 38 at one end and terminated at its other end in a closed eye formation 40 that is hinged to a lashing knuckle 42. The knuckle 42 includes an arcuate body 44 having at one end a pair of oppositely spaced flanges 46 with opposed openings 48 through which is rotatably supported a pin 50 for rotatably carrying the eye formation 40. At the other end of the body 44 is shown a pair of transversely extending flat lugs 52 that are connected to the flanges 46 by an arcuate neck 54.

In operation, let it be assumed that the socket 1 is installed, as by welding, in and level with the top surface of the deck 14. The first step is to remove any standing water, debris and dirt from the cavity 32 of the socket 12. As a precaution, about 4 ounces of commercial grade antifreeze are put into the socket after which the insert 10 is pushed through the clover-leaf opening 30 into the cavity 32 of the socket 12 to fill the same, as seen in FIG. 3. Any spilled antifreeze is removed from the surface of the socket. The socket 12 is now in condition for receiving therein the lashing knuckle 42 for binding a container (not shown) to the deck 14. Initially, the knuckle 42 is manually held with the lugs 52 in longitudinal alignment with one of slots 56 of the clover-leaf opening 30 and pushed into the slot 56 (FIGS. 2&4). In pushing the lugs 52 downwardly, as seen in FIG. 2, the insert 10 is compressed and upon passing of the lugs 52 beyond the underside of the plate 26, the knuckle 42 is rotated 90° to place the lugs at right angle with the slot 56 and in rigid engagement with the underside surface of the plate 26, as seen in FIG. 4, thereby anchoring the lashing knuckle 42 to the ship's deck 14 to secure thereto the container (not shown).

Figure 5:
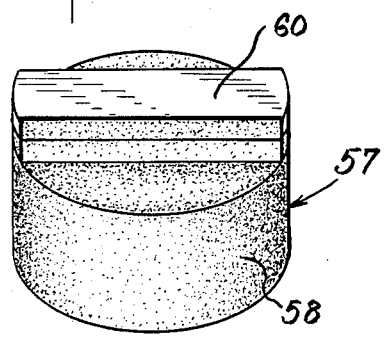
FIG. 5 is a perspective view of another embodiment of insert having a rounded, rectangular shaped upper portion thereof.
Figure 6:
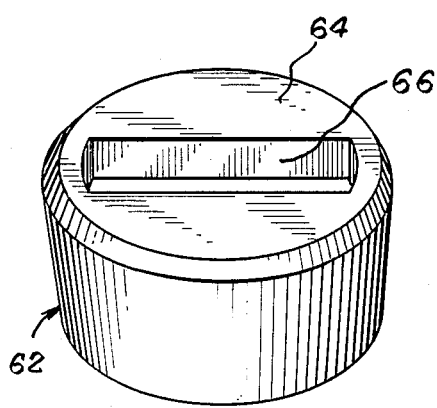
FIG. 6 is a perspective view of a socket used in conjunction with the insert shown in FIG. 5.

Another embodiment of insert-socket arrangement is shown in FIGS. 5 and 6. In FIG. 5, the insert 57 also comprises a two piece glued unit having a base 58 and a top 60 of polyether foam like that described in FIG. 1, and in which the top 60 is substantially rectangular with rounded ends. In FIG. 6 the socket 62 has a plate 64 with an opening 66 that is substantially rectangular with rounded ends in conformity with the top 60 shown in FIG. 5.

Figure 7:
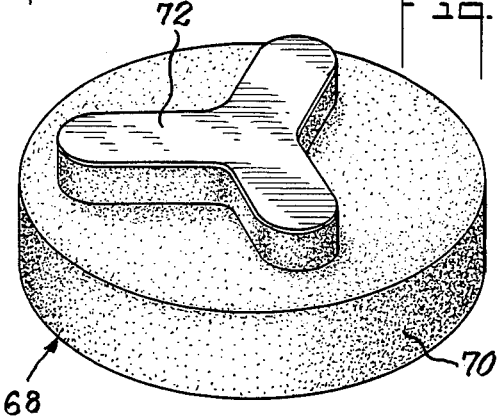
FIG. 7 is a perspective view of still another embodiment of insert showing a three pronged upper portion thereof.
Figure 8:
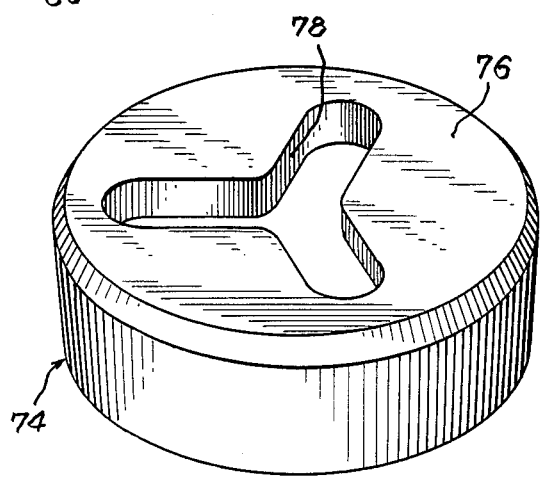
FIG. 8 is a perspective view of a socket used in conjunction with the insert shown in FIG. 7.

Still another embodiment of insert-socket arrangement is shown in FIGS. 7 and 8. In FIG. 7, the insert 68 also comprises a two piece glued unit having a base 70 and a top 72 of polyether foam like that described in FIG. 1, and in which the top 72 is three pronged. In FIG. 8. the socket 74 has a plate 76 with a three pronged opening 78 in conformity with the top 72 shown in FIG. 7.

From the foregoing description it will be seen that the present invention provides an improved uniform, flat deck surface wherein the recessed deck securing sockets having their cavities filled with inserts of polyether foam that allow the lashing binder knuckles to be readily inserted into and removed from the socket cavities while at the same time the insert filled socket cavities prevent the entrance thereinto of water, debris etc.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In a steel container ship, an insert for filling a cavity of a socket installed flush with a deck's surface of said ship for securing a container by lashing equipment to the deck, said socket including a top plate rigidly secured to said socket and to said deck with an upper surface of said plate being flush with said deck, said plate having an opening for permitting a lashing knuckle of the lashing equipment to be inserted through said plate opening into the filled cavity of said socket for engagement with an underside portion of said top plate so as to secure said container to said deck socket and for permitting the lashing knuckle to be withdrawn therefrom for releasing the container, said insert comprising an elastomeric element consisting of a base conforming to the cavity of said socket and filling said cavity, a top of said element conforming to said plate opening so as to fill said plate opening flush with said upper plate surface, and adhesive means for securing said top of said elastomeric element to said base of said elastomeric element, said elastomeric element being of such resilient consistency whereupon insertion of the lashing knuckle through the plate opening depresses that portion of the top elastomeric element engaged by the lashing knuckle while part of the remaining portion of the top elastomeric element remains substantially undepressed within the plate opening and substantially flush with the top surface of said plate, thus preventing debris from entering the cavity during securement of the container by the lashing equipment.

2. An insert in accordance with claim 1, wherein said top of said elastomeric element is of a clover-leaf formation in conformance with a clover-leaf opening in said plate and wherein upon insertion of said lashing knuckle through one leaf of said clover-leaf plate opening a portion of one leaf of said clover-leaf is depressed, while part of the remaining portion of said one leaf of said clover-leaf top and the remaining leaf portions of said clover-leaf top remain substantially undepressed within said clover-leaf plate opening and thus said latter portions remain substantially flush with the top surface of said plate.

3. An insert in accordance with claim 1, wherein said top of said elastomeric element is of substantially rectangular formation with rounded ends in conformance with a rectangular opening and rounded ends in said plate and wherein following insertion of said lashing knuckle through one portion of said rectangular plate opening a portion of said top rectangular elastomeric element is depressed while part of the upper surface of the remaining portion of said top rectangular elastomeric element remains substantially flush with the top surface of said plate.

4. An insert in accordance with claim 1, wherein said top of said elastomeric element is of a three pronged formation in conformance with a three pronged opening in said plate and wherein following insertion of said lashing knuckle through a portion of one prong of said three pronged plate opening a portion of said one prong of said top elastomeric element is depressed while part of the upper surface of the remaining portion of said one prong and the upper surfaces of the other two prongs of said top three pronged elastomeric element remain substantially flush with the top surface of said plate.

5. In a system for lashing a container to a deck of a steel container ship, in combination, a socket rigidly secured to said deck, said socket having a cavity, a face plate rigidly secured to said socket having an upper surface flush with said deck and covering said cavity, said face plate having an opening therein for entrance into said cavity, an elastomeric resilient insert filling said cavity and said face plate opening flush with the deck for preventing foreign material from entering into said plate opening and cavity, a binder tiedown rod for lashing said container to said deck, and a lashing knuckle at one end of said binder tie-down rod for insertion through said plate opening into said cavity to be secured by an underside surface of said face plate and for withdrawal therefrom with said elastomeric resilient insert present at all times within said socket cavity and plate opening, said plate opening being of a clover-leaf formation, said insert consisting of a base portion having a cylindrical formation in conformance with a cylindrical cavity in said socket, and of a top portion having a clover-leaf formation in conformance with said plate clover-leaf opening, so that upon insertion of said lashing knuckle through one leaf of said clover-leaf plate opening a portion of one leaf of said clover-leaf top portion is depressed, while the remaining portion of said one leaf of said clover-leaf top and the remaining leaf portions of said clover-leaf top remain substantially undepressed within said plate clover-leaf openings, thus remaining substantially flush with the top surface of said plate.

* * * * *